E. JOHNSON & D. B. COX.

COOKING STOVE.

No. 138.

Reissued June 19, 1849.

THE NORRIS PETERS CO., PHOTO-LITHO., WASHINGTON, D. C.

UNITED STATES PATENT OFFICE.

ELIAS JOHNSON AND DAVID B. COX, OF TROY, ASSIGNORS TO R. D. GRANGER, OF ALBANY, NEW YORK.

IMPROVEMENT IN COOKING-STOVES.

Specification forming part of Letters Patent No. 4,119, dated July 22, 1845: Reissue No. 138, dated June 19, 1849.

*To all whom it may concern:*

Be it known that we, ELIAS JOHNSON and DAVID B. COX, of the city of Troy, county of Rensselaer, and State of New York, have invented new and useful Improvements in Cooking-Stoves; and we do hereby declare that the following is a full, clear, and exact description of the principle or character which distinguishes them from all other things before known, and of the manner of making, constructing, and using the same, reference being had to the accompanying drawings, making part of this specification, in which—

Figure 1:
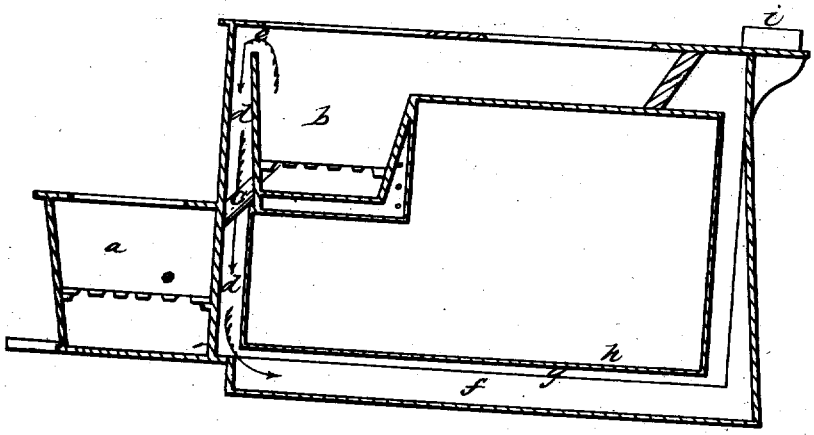
Figure 2:
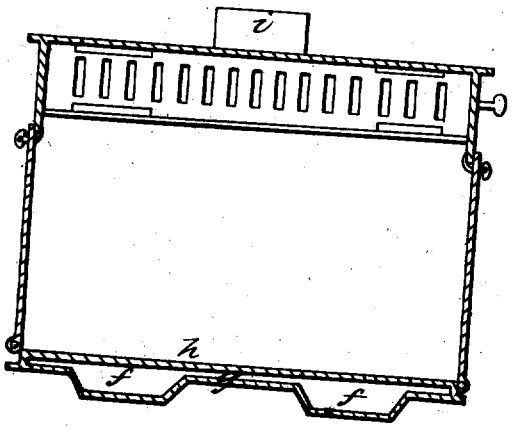

Figure 1 is a longitudinal vertical section of the improved stove, and Fig. 2 a cross-vertical section of the same.

The same letters indicate like parts in the two figures.

One of the chief difficulties in cooking-stoves has been the diffusion of heat so as to obtain an equal temperature in the oven, the parts nearest the doors being always less heated than the middle; and in stoves with two fire-places (one in the hearth) it has been found there is difficulty in carrying the products of combustion of both around the oven or ovens.

The object of our invention is to avoid these evils; and to this end the first part of our invention consists in making depressions or recesses in the bottom flue below the oven-bottom and toward the sides thereof, so that the greater parts of the heated products of combustion shall pass along under the oven-plate through the parts of the flue or flues thus enlarged, and in this way avoid the concentration of heat in the middle of the oven; and the second part of our invention consists in combining a fire-place in the front hearth, or in what is called the "summer arrangement," with the fire-place in the body of the stove, by means of a pipe or flue passing from the first to the ash-pit of the second, and through the front diving flue, which carries down the products of combustion from the fire-chamber in the body of the stove, to the flue or flues below the oven.

In the accompanying drawings, *a* represents a fire-chamber in front of the stove, usually called the "summer arrangement," and provided with boiler-holes and other appendages not necessary to describe, as these make no part of our invention. An inclined flue-tube, *c*, passes from the upper part of this fire-chamber to the ash-pit of a second fire-chamber, *b*, in the body of the stove, so that the products of combustion from the fire-chamber *a* have to pass through the other fire-chamber, *b*. The oven is placed back of the fire-chamber *b*, and extends under it, and the two may be separated by an air-chamber, to prevent the burning and overheating of the oven-plates. When it is not required to heat the oven, the products of combustion pass directly from the fire-chamber *b* to the exit-pipe *i* through a damper placed in any desired place above the oven; but when this damper is closed the products of combustion pass down a diving-flue, *d*, between the two fire-places and in front of the oven, and thence to the flue under the oven-bottom *h*; but in passing down the flue *d* the current is broken and divided by and passes on each side of the flue-pipe *c*, which connects the two fire-places. The bottom flue-plate is formed with two parallel depressions, *f f*, through which the great bulk of the products of combustion pass, and these are formed near the sides of the oven, the other parts of this plate, as at *g*, being within a short distance of the oven-bottom *h*. In this way it will be seen that the great bulk of the products of combustion from the diving flue *d*, on their way to the flue at the back of the oven and leading to the exit-pipe *i*, will pass mainly through the enlarged parts of the bottom flue formed by the depressions *f f*, without, however, entirely cutting off the heat from the other parts of the oven-bottom, and that in this way the concentration of heat toward the middle of the oven will be prevented and the heat of the oven equalized. But for this arrangement of the bottom flue the products of combustion in passing from the diving flue would tend to take a direct course toward the exit-pipe, and thus concentrate and give more heat to the middle than the sides of the oven, this inequality of heat being still further increased by the outward radiation of heat from the sides of the stove and by the air which enters the ovens through the doors; but by means of the before-described depressions this is equalized, particularly as these depressions may be placed as far apart as desirable and made of any required capacity.

We do not wish to limit ourselves in the construction of stoves to the use together of the two improvements hereinabove specified, as either may be used separately—as, for instance, the advantages derived from the depressed flues may be obtained without the manner of connecting the two fire-places; and in like manner all the advantages of the manner hereinabove described of combining and connecting the two fire-places may be obtained without the depressed flues; but when both improvements are employed in connection the best results will be obtained; nor do we wish to limit ourselves to the employment of our depressed flues for carrying the draft around the oven in the manner described, as the depressions in the bottom flue may be used in connection with other arrangements of flues, whether for carrying the draft in the direction described or in any other.

What we claim, therefore, as our invention, and desire to secure by Letters Patent, is—

1. Making the depressions in the bottom flue below the oven, substantially as described, for the purpose of equalizing the heat in the oven, as described.

2. The combination of the two fire-places by means of a flue-pipe connecting the one with the ash-pit of the other and passing through the diving flue to divide the draft, substantially as described, and thus insure the passage of the heated products of the combustion from either or both around the oven when desired, as described.

ELIAS JOHNSON.
DAVID B. COX.

Witnesses:
SAMUEL PIERCE,
JAMES SHIELDS.